United States Patent [19]

Madsen

[11] Patent Number: 4,621,004

[45] Date of Patent: Nov. 4, 1986

[54] DISPOSABLE CAR SEAT LINING

[76] Inventor: Laurie Madsen, 6 W. Cedar, New Baden, Ill. 62265

[21] Appl. No.: 772,043

[22] Filed: Sep. 3, 1985

[51] Int. Cl.⁴ .............................................. B32B 3/06
[52] U.S. Cl. ...................................... 428/80; D6/611
[58] Field of Search ................ D6/501, 611; D24/51; 4/540; 604/358, 393; 428/80, 81

[56] References Cited

U.S. PATENT DOCUMENTS

| | | | |
|---|---|---|---|
| D. 257,084 | 9/1980 | Fuller et al. | D6/611 |
| D. 261,429 | 10/1981 | Hanna-Burns | D24/51 |
| D. 266,802 | 11/1982 | Gooding | D6/501 |
| D. 283,475 | 4/1986 | Reece | D6/611 |
| 3,758,363 | 9/1973 | Frick | 604/358 X |
| 3,950,578 | 4/1976 | Laumann | 427/378 |
| 4,034,424 | 7/1977 | Budlong | 4/540 |
| 4,483,895 | 11/1984 | Deaver | 428/198 |

*Primary Examiner*—Henry F. Epstein

[57] ABSTRACT

A disposable car seat liner is provided including an absorbent disposable material to absorb moisture and a facing which holds the absorbent material in place. Preferably, in addition, a more rugged backing material is provided, for example made of vinyl material. The disposable car seat liner includes a longitudinally extending body portion with a slit provided in its lower end to receive a car seat strap. L-shaped side members are attached to either side of the body portion. The L-shaped legs extend outwardly near the middle of the body portion. A fold line is defined in the mid portion of the L-shaped legs which extends the full transverse extent of the liner. Only the upper portion of the L-shaped side member is attached to the body portion. When the liner is placed within the car seat the upper portion of the side and the body portion extend vertically within the car seat. The portion of the body portion below the fold line and a portion of the L-shaped legs below the fold line extend horizontally in the seat. The L-shaped side members, below the fold line, are folded below the body to define a pocket within which a child may sit. In a preferred embodiment the slit area of the lower body portion is reinforced.

15 Claims, 5 Drawing Figures

4,621,004

DISPOSABLE CAR SEAT LINING

BACKGROUND OF THE INVENTION

Disposable diapers containing cotton batting are widely used to facilitate care of small children.

In addition in hospitals disposable shields are used, for example in the treatment of women who have given child birth and in applications where people cannot control their bodily functions.

Car seats for children in automobiles have been on the market for some time. However, accidents and spills with children in place in these car seats make them difficult to clean. The car seats frequently contain slots and straps which are particularly difficult to clean. Spills, vomiting, diarrhea and other accidents require frequent cleaning of such linings.

SUMMARY OF THE INVENTION

A. Objects:

1. One object of the invention is to provide a disposable car seat liner wherein in the event of an accident the liner may disposed of and the car seat remain in place in relatively clean condition.

2. Another object of the invention is to avoid frequent cleaning required of car seats because of accidents and spilling in use.

3. Another object of the invention is to provide a disposable liner for use in connection with strollers, high chairs and other similar devices wherein children are strapped in place and wherein accidents frequently occur.

B. Summary:

A disposable car seat liner is provided including an absorbent disposable material to absorb moisture and a facing which holds the absorbent material in place. Preferably, in addition, a more rugged backing material is provided, for example made of vinyl material. The disposable car seat liner includes a longitudinally extending body portion with a slit provided in its lower end to receive a car seat strap. L-shaped side members are attached to either side of the body portion. The L-shaped legs extend outwardly near the middle of the body portion. A fold line is defined in the mid portion of the L-shaped legs which extends the full transverse extent of the liner. Only the upper portion of the L-shaped side member is attached to the body portion. When the liner is placed within the car seat the upper portion of the side and the body portion extend vertically within the car seat. The portion of the body portion below the fold line and a portion of the L-shaped legs below the fold line extend horizontally in the seat. The L-shaped side members, below the fold line, are folded below the body to define a pocket within which a child may sit. In a preferred embodiment the slit area of the lower body portion is reinforced.

DESCRIPTION OF PREFERRED EMBODIMENTS

Figure 4:
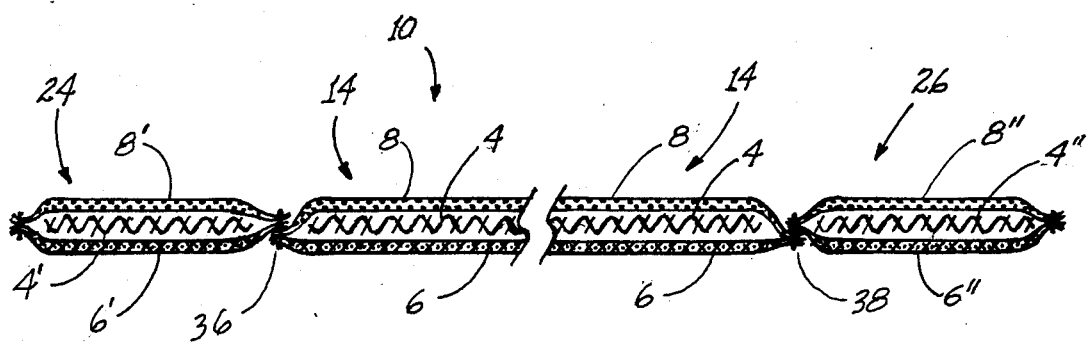
FIG. 4 is a sectional view illustrating the components of the car seat liner along the line 4—4 in Figure

The car seat liner 10 of the present invention is a composite system shown in FIG. 4 including a disposable diaper type material which is highly liquid absorbent such as cotton batting 4 located upon a backing 6 which is made of rugged and non-absorbent, and preferably water repellent material. For example a vinyl is a suitable backing material. Preferable a permeable facing 8 holds the absorbent material in place on the backing. Paper facing or a cotton polyester blend fabric material is suitable. Preferably moisture can only pass into the batting, and not in the batting outwardly.

In order to form the liner 10 of the present invention a generally rectangular liner body portion 12 is provided. The body portion includes a portion 14 adopted to be located on the back of the car seat. A fold 16 is defined approximately midway in the body portion for example, by sewing. The lower body portion 18 is provided with a slit 20 generally in the mid portion of the body portion which extends transversely at 21 a significant distance up from the bottom 22 of the body portion.

On either side of the body portion side portions 24 and 26 are provided. These side portions are generally L-shaped including a first leg 28, 30 and a lower outwardly extending leg 32 and 34. The upper legs 28 and 30 are adapted to be attached to the body portion for example by stitching or sewing along the outer surface of the body portion as indicated at 36 and 38, The mid portion of the lower legs 32 and 34 are aligned with the fold 16. This may be accomplished, for example, by a sewing or stitching as indicated at 32s and 34s, which aligns with the fold 16. The sewing lines 36 and 38 only extend down to the fold line 32s, 16, 34s. This dependent portions 32d and 34d are provided below the fold line.

Figure 1:
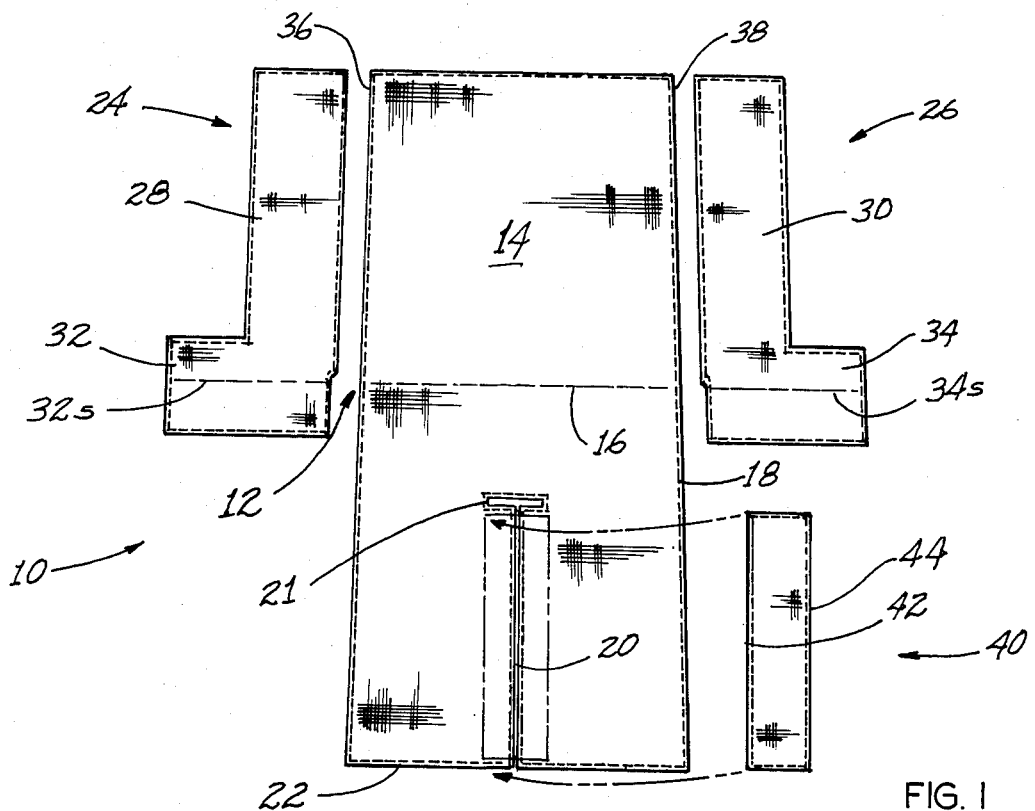
FIG. 1 is a exploded view of the various elements of the car seat liner of the present invention.
Figure 2:
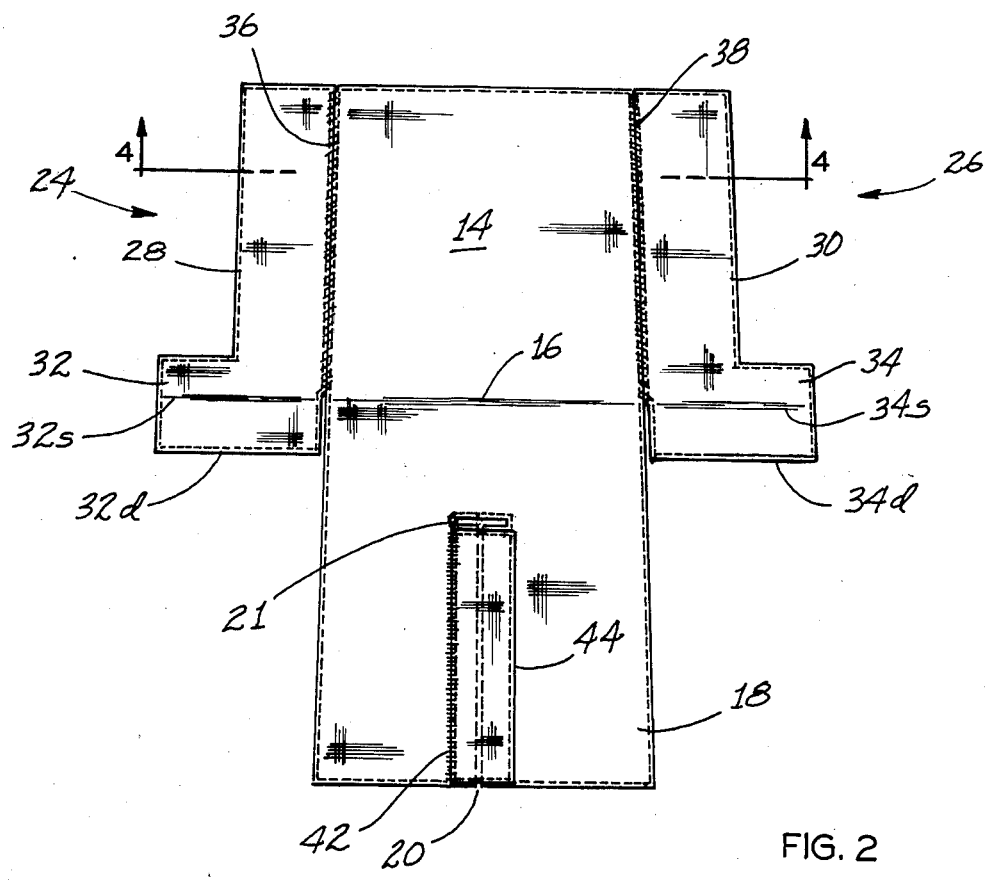
FIG. 2 is a elevation view of these elements sewn in place.
Figure 3:
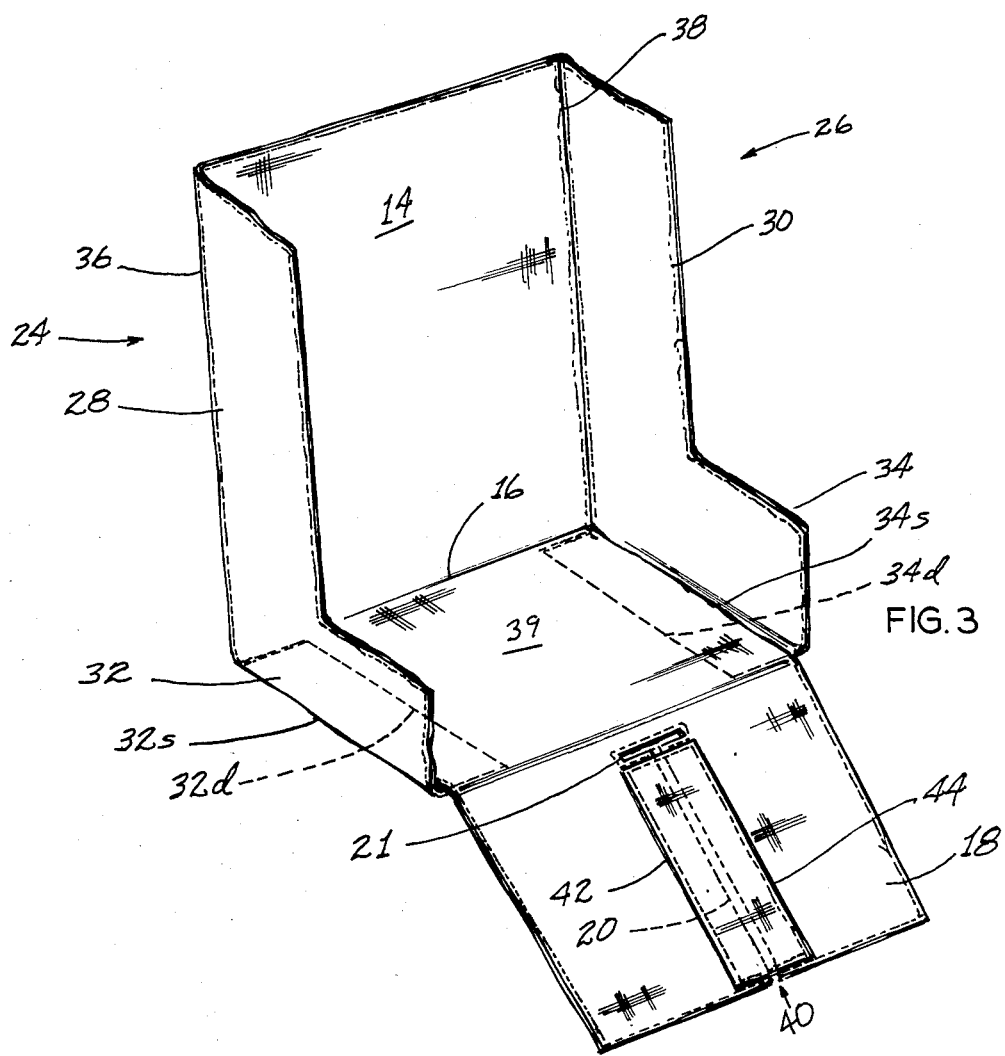
FIG. 3 is a perspective view illustrating the location of the elements shown in FIG. 2 in a car seat according to the present invention.

As illustrated in FIG. 3, when the assembly is folded in place in the car seat the depending portions 34d and 32d are folded below the body portion 18 as shown to define a pocket 39 into which is located the lower portion 18 of the body portion.

The location of the portions 32d and 34d below the horizontal portion 18 makes an effective pocket area for the child or incapacitated person to set in.

The slit 20 is to accommodate a car seat strap $S_3$. It is preferred to utilize a separate flap arrangement indicated generally at 40. This flap includes body portion 44 which is attached in any suitable manner to the lower body portion 18, for example by sewing along the edge 42 and which reinforces the slit area of the body portion.

Figure 5:
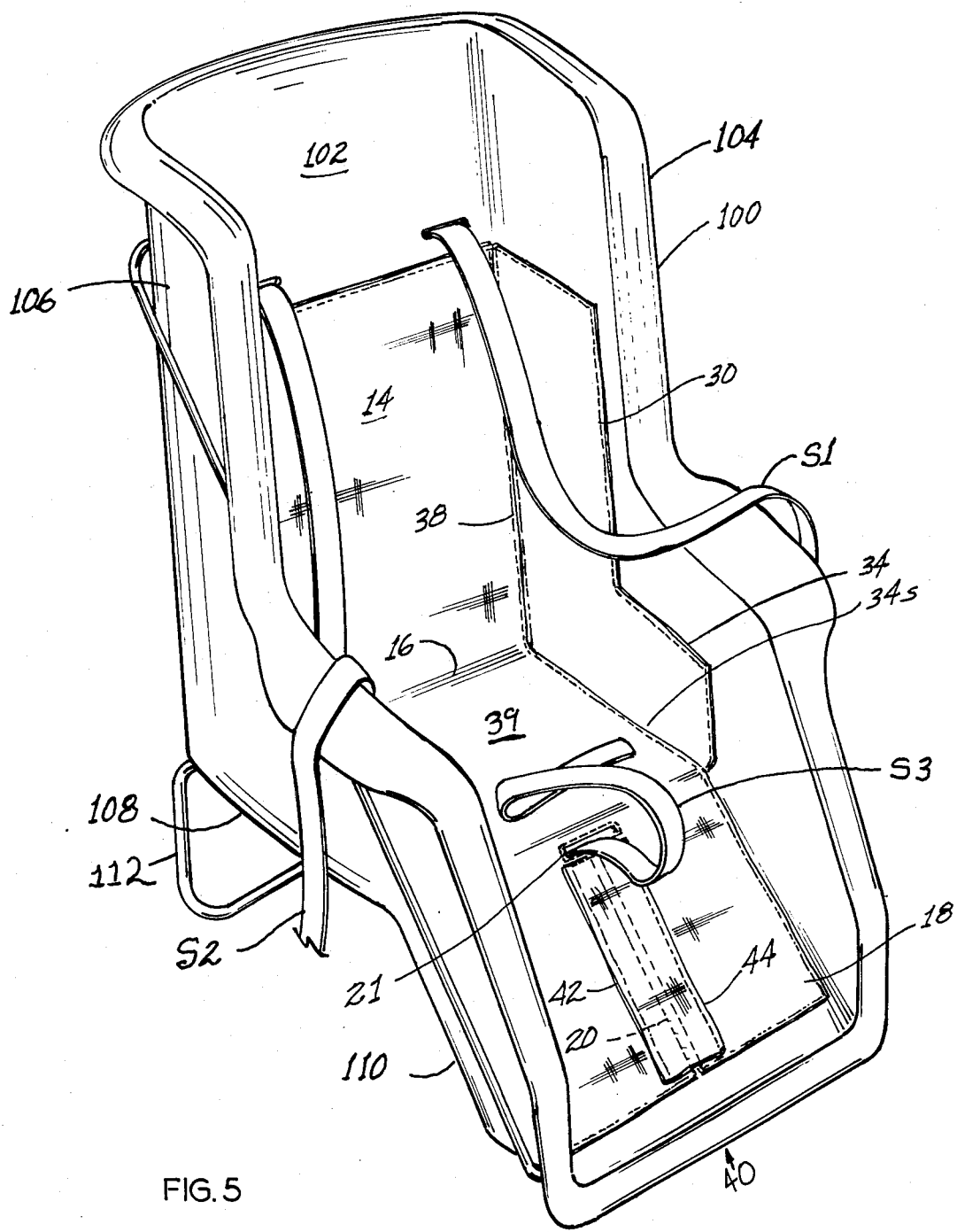
FIG. 5 is a perspective view of the liner in place within the car seat.

FIG. 5 shows the lines in place within a conventional car seat 100. The upper straps $S_1$ and $S_2$ pass through the care seat rear wall 102 at a level above the car seat lines. The lower strap $S_3$ extends through the lower portion of the car seat and the seat includes generally vertical side walls 104 and 106, a generally horizontal wall 108 and an inclined lower portion 110. A metal support 112 is used to hold the car seat in place.

It will be apparent that in addition to a car seat, the liner of the present invention may also be used in a stroller, in a high chair, and in other devices where small children or incapacitated people are subject to messy accidents.

It the event of such an accident, the child or incapacitated person is unstrapped, the liner is removed through slot 20. The seat may then be washed or cleaned with a damp cloth, and a new clean liner located within the seat.

What is claimed is:

1. A disposable seat liner comprising: a composite material including a disposable material to absorb moisture; a facing which holds the absorbent material in place; said disposable car seat liner composite material including a longitudinally extending body portion having an end portion with a slit provided therein to receive a car seat strap; laterally spaced L-shaped side members attached to either side of the upper body portion; each L-shaped member having a leg extending outwardly from near the middle of the body portion; a fold line defined in the mid portion of the L-shaped legs and extending through the transverse extent of the liner, whereby when the liner is placed within a car seat, the upper portion of the sides and the body portion extend vertically within the car seat, the body portion and the portion of the L-shaped legs below the fold line extend generally horizontally in the seat, and whereby the L-shaped side members below the fold line and the body portion below the fold line define a pocket within which a child may sit.

2. A disposable seat liner according to claim 1 wherein, in addition, a backing material is provided.

3. A disposable seat liner according to claim 2 wherein the backing is made of vinyl material.

4. A disposable seat liner according to claim 3 wherein the slit area of the lower body portion is reinforced.

5. A disposable seat liner according to claim 4 wherein the reinforcement comprises a flap attached to the lower body portion adjacent the slit.

6. A disposable seat liner comprising: a liner composed of composite material including a layer of disposable absorbent material to absorb moisture; a facing which holds the absorbent material in place; said disposable car set liner including a longitudinally extending body portion having an end portion with an opening provided therein to receive a car seat strap; laterally spaced side members attached to either side of the upper body portion; each side member having a leg extending outwardly from near the middle of the body portion; a fold line defined in the mid portion of side members and extending through the transverse extent of the liner, whereby when the liner is placed within a car seat, the upper portion of the sides and the body portion extend vertically within the car seat, the lower body portion and the portion of the side members below the fold line extend generally horizontally in the seat, and whereby lower portion of side members below the fold line and the body portion below the fold line define a pocket within which a child may sit.

7. A disposable seat liner according to claim 6 wherein, in addition, a backing material is provided on the absorbent material.

8. A disposable seat liner according to claim 7 wherein the backing is made of vinyl material.

9. A disposable seat liner according to claim 6 wherein the opening comprises a slit area.

10. A disposable seat liner according to claim 9 wherein the lower body portion is reinforced.

11. A disposable seat liner according to claim 10 wherein the reinforcement comprises a flap attached to the lower body portion adjacent the slit.

12. A disposable seat liner comprising: a liner composite material including disposable material to absorb moisture; and a facing which holds the absorbent material in place; said disposable car seat liner including a longitudinally extending body portion having an opening provided therein to receive a car seat strap; laterally spaced L-shaped side members integral with the respective side of the upper body portion; having a leg extending outwardly from near the middle of the body portion; a fold line defined in the mid portion of the body portion and extending through the transverse extent of the side members, whereby when the liner is placed within a car seat, the upper body portion and the side portions extend vertically within the car seat, the lower body portion and the side portions below the fold line extend generally horizontally in the seat, and whereby the body portions below the fold line defines a pocket within which a child may sit.

13. A disposable set liner according to claim 12 wherein, in addition, a backing material is provided.

14. A disposable seat liner according to claim 13 wherein the backing is made of vinyl material.

15. A disposable seat liner according to claim 12 wherein the side members are separately attached to the body portions.

* * * * *